3,644,309
United States Patent Office
Patented Feb. 22, 1972

---

3,644,309
HYDROCARBON-SOLUBLE RUBBERY COPOLYMERS OF α-OLEFINS
Edward William Duck, Dibden Purlieu, Southampton, John Howard Farmer, Southampton, and Brian John Ridgewell, Hythe, Southampton, England, assignors to The International Synthetic Rubber Company Limited, Southampton, England
No Drawing. Filed July 19, 1968, Ser. No. 745,982
Claims priority, application Great Britain, July 21, 1967, 33,661/67
Int. Cl. C08f *15/04, 15/40;* B01j
U.S. Cl. 260—80.78
14 Claims

ABSTRACT OF THE DISCLOSURE

A catalyst system for the preparation of homo- and copolymers of α-olefins comprises (a) a hydrocarbon-soluble compound of vanadium, titanium or zirconium,
(b) a hydrocarbon soluble adduct of
 (i) aluminium trichloride or aluminium dichlorohydride and
 (ii) a polar compound, and
(c) an organo-metallic compound of lithium.

---

The present invention relates to catalyst systems for polymerisation of olefins and in particular to catalysts which include, as one component, a chloro-aluminium compound.

In British patent specifications Nos. 1,077,397 and 1,113,898 catalyst systems are described which are suitable for the production of hydrocarbon-soluble, rubbery copolymers of α-olefins, such as ethylene-propylene, ethylene-butene-1, propylene-heptene-1. The catalysts systems of these British patent specifications are also suitable for the homopolymerisation of α-olefins. In these cases the products are either thermoplastics or atactic rubbers. Such use of the catalyst system of specification No. 1,077,397 is described and claimed in copending patent application No. 41,144/67, now British Pat. 1,127,590.

The catalysts disclosed in these specifications comprise three components, all three of which are essential to bring about polymerisation. These catalysts are of the type which include:

(a) a hydrocarbon-soluble compound of vanadium, or, in some cases, hydrocarbon-soluble compounds of titanium or zirconium,
(b) a halogen compound of aluminium and
(c) an organo-metallic compound of lithium.

Component (a), the vanadium compound may or may not contain a halogen to metal bond. The aluminium compound, component (b), is generally an aluminium trihalide or an aluminium dihalohydride.

It is clearly stated in these specifications that for the production of soluble rubbery homo-copolymers, the preferred aluminum compounds are aluminum tribromide or tri-iodide and their mono-hydrido derivatives. Aluminium trichloride and its monohydrido derivative, being essentially insoluble in hydrocarbons, leads to poor yields of soluble materials although good yields of, for example, the insoluble homopolymer of ethylene can be obtained.

Thus, the disadvantages of using aluminium trichloride or aluminium dichlorohydride in the catalyst combinations described in these application for the production of the hydrocarbon-soluble amorphous, random, rubbery homo- or copolymers of α-olefins are as follows:

(1) They are essentially insoluble in hydrocarbons so that when they are employed in the aforementioned catalyst systems very poor yields of soluble products are obtained. Furthermore, in the case of copolymerisation the yield is contaminated with variable amounts of insoluble, block copolymer.

(2) The rate of polymerisation is sensitive to the particle size of the aluminium chloride or dichlorohydride and hence it is difficult to predict the rate of, and thus to control, the process. Such a process is wasteful on the aluminium compound since only the surface layer, and the small amount which dissolves in the solvent, is used.

(3) The polymerisations are more sensitive than usual to traces of oxygen and water which react with and render ineffective the surface of the aluminium compound.

However, it would be advantageous to be able to use aluminium trichloride as component (b) in such catalysts since it is considerably cheaper than other trihalides of aluminium. It is evident from the above that a soluble form of aluminium trichloride (or dichloro-hydride) is required.

It is the purpose of this invention to describe a simple, cheap and very effective means of overcoming the disadvantages listed above. The invention enables aluminium trichloride or dichlorohydride to be used, for the first time, to give very high yields of hydrocarbon-soluble, rubbery homo and copolymers of α-olefins.

It is to be understood that in this specification the words polymerise, polymerisation and polymer are intended to mean both copolymerisation and homopolymerisation except where the context indicates otherwise.

Simple polar compounds such as ethers, thioethers, cyanides, tertiary amines are known to dissolve aluminium trichloride and aluminium dichlorohydride by the formation of 1:1 adducts. However the resulting activity of the aluminium halide in polymerising α-olefins to high yields of thermoplastic polyethylene and soluble polymers from other olefins, when used in combination with a vanadium compound and a lithium organo-metallic compound, was entirely unexpected and could not have been predicted from previous work.

It is well known that the quantities of polar compounds used in this invention are sufficient to render inactive or to reduce greatly the activity of the typical so-called "Ziegler-Natta" catalyst combinations for the polymerisation of α-olefins. This demonstrates the chemical difference of the catalyst we now describe from the "Ziegler-Natta" catalysts.

According to the persent invention a catalyst system suitable for the preparation of homo- and co-polymers of α-olefins comprises:

(a) a hydrocarbon-soluble compound of vanadium, titanium or zirconium, as hereinafter defined,
(b) a hydrocarbon soluble adduct of:
 (i) aluminium trichloride or aluminium dichlorohydride and
 (ii) a polar compound, and
(c) an organo-metallic compound of lithium Also according to the invention is a process for the preparation of homo- and co-polymers of two or more α-olefins and optionally not more than 10% by weight of a non-conjugated diene by means of the catalyst just described.

All the catalyst components are essential in this invention for the production of hydrocarbon-soluble rubbery homo or copolymers of α-olefins.

The molecular ratio between component b(ii), the polar compound and component b(i) the aluminium trichloride or dichlorhydride may be in the range 0.1–10:1 but is preferably in the range 0.5–5:1. The molecular ratio of component b(i) to component (a) is not critical and may lie in the range 5–100:1 but for reasons of cost a ratio in the range 10–50:1 is normally employed. The molar ratio of component b(i) to component (c) may lie within the range 0.1–10:1 but is preferably within the range 0.25–5:1.

The absolute concentration of component (a) should be as low as possible for economy and practicability. Concentrations within the range 0.1–10 mg. atom metal per litre of total solution are normally employed.

The components may be mixed in any order in the presence or absence of monomers and solvent. However, for the reasons given hereinbefore, it is preferred that components b(i) and b(ii) should be pre-mixed together rather than be formed inefficiently in situ.

The soluble combination then reacts with components (a) and (c) in any order, preferably, but not essentially, in the presence of monomers and solvent.

Examples of component (a) fall into two classes:

(i) Those of vanadium in which a halogen is directly attached to the metal atom. These compounds are described in British patent specification No. 1,113,898.

The general formula of this class is $VOX_n(OR)_{3-n}$ where X is a halogen, $3 \geq n \geq 1$, and R is alkyl, aryl or alkylaryl. Thus compounds of the type $VX_4$ and its derivatives are specifically excluded from this invention. Examples included within this invention are vanadyl trichloride, vanadyl tribromide, vanadyl diethoxy chloride.

(ii) Those of vanadium, titanium and zirconium in which a halogen atom is not directly attached to the metal. These are the compounds used in the catalysts system disclosed in British patent specification No. 1,077,397 and copending application No. 41,144/67, now British Pat. 1,127,590. Examples of this class are vanadyl tri-n-butoxide, vanadyl diisopropyl salicylate, vanadium tris acetylacetonate, and the corresponding titanium and zirconium compounds.

Examples of component (b)(ii), the polar compound, are dialkyl, diaryl, alkylaryl ethers such as di-n-butyl ether, di-isoamyl ether, diphenyl ether, dibenzyl ether and "mixed" ethers such as anisole, phenetole, ortho-methoxy and orthoethoxy toluene, benzyl phenyl ether, benzyl n-butyl ether. Preferred examples are anisole, ortho methoxy toluene, di-isoamyl ether and di-n-butyl ether.

The corresponding thio-ethers are also effective in the system. Another class of examples of this component is the cyanides or nitriles. These may be aliphatic, aromatic or aliphatic-aromatic such as n-butyl cyanide, benzonitrile, benzylcyanide. Tertiary amines may also be used: these may be aliphatic, aromatic or aliphatic-aromatic e.g. tri-n-butylamine, triphenylamine, tribenzylamine, or "mixed" tertiary amines such as benzyl diisoamylamine.

The polar compound need not itself be a liquid, but it should be at least partially soluble in hydrocarbons to give solutions at the appropriate concentration, and must be capable of forming an adduct with aluminium trichloride or dichlorhydride.

This adduct is preferably completely soluble in hydrocarbon solvent. Polymerisation may still be obtained using an adduct which is sufficiently soluble to promote reaction but insufficiently soluble in the hydrocarbon solvent to dissolve completely. In this case the adduct is used as a dispersion. In general, however, the use of a dispersion is not desirable for the reasons given previously, although better yields may be obtained using such as adduct in preference to aluminium trichloride or dichlorohydride alone as the (b) component of the catalyst. Normally the adduct is 1:1 but excess polar compound is not harmful and may be present in ratios of polar compound:aluminium trichloride or dichlorohydride of e.g. 2:1, 5:1, etc. However molar ratios of <1:1 can also be used and in such cases complexes of ratio 1:2 may be formed which may then solubilise the remainder. This circumstance may arise when a premix of b(i) and b(ii) is not made and where reaction of b(i) with the other component liberates enough polar compound to solubilise the remainder or at least more of this component.

Examples of component (c) are alkyl, aryl and aralkyl derivatives of lithium such as ethyllithium, n-butyllithium, phenyl lithium, benzyl lithium and naphthyl lithium.

Examples of α-olefins which may be polymerised in accordance with this invention are propylene, butene-1, pentene-1, 4-methyl pentene-1, heptene-1. Ethylene polymerised alone gives a crystalline thermoplastic whereas for example propylene or 4-methyl pentene-1 polymerised alone in accordance with the invention give an atactic rubber product. Similarly ethylene and propylene may be copolymerised to an amorphous, hydrocarbon-soluble, rubbery copolymer using this process. Any relative proportions of monomers may be copolymerised, but where the ethylene is co-polymerised the products are not always rubbers: e.g. for the case of ethylene-propylene copolymers, the totally rubbery region comprises the range ethylene 0–80 moles percent/propylene 100–20 moles percent. Rubbery copolymers are also obtained from propylene/butene, propylene/heptene-1 and with other combinations of typical α-olefins.

The present invention is not limited to the case where one α-olefin is ethylene or to the copolymerisation of only two monomers. Any number of α-olefins may be polymerised together to a multipolymer: no significant amounts of homopolymers are formed from mixtures of monomers.

A small amount, preferably 2–10% by weight of a non-conjugated diene such as dicyclopentadiene, 5-ethylidene norbornene, hexadiene-1,4 or cis, trans, trans cyclododecatriene-1,5,9 may be incorporated. Inclusion of one of these monomers enables a rubber to be produced which has sufficient residual unsaturation to enable vulcanisation to be effected with the conventional sulphur containing recipes.

Polymerisation may be carried out in the temperature range —50° C. to +150° C., but preferably at —15° C. to +30° C. and at pressures ranging from atmospheric pressure to 50 atmospheres above atmospheric. Usually, pressures up to 5 atmospheres are used since above this pressure, special and costly apparatus must be employed.

The polymerisations are preferably, but not essentially, carried out in an inert hydrocarbon solvent such as hexane, heptane, isooctane, cyclohexane. Solvent may, however, be omitted and the polymerisations carried out in the liquified monomers as solvent and reactants.

The solvent, monomers and catalysts should be anhydrous and free from uncombined oxygen and sulphur.

To control, i.e. reduce, the molecular weight of the product, hydrogen may be introduced at low concentrations (less than 10% by volume of the total gaseous monomer feed would be used). Concentrations of the order of as little as 0.4% hydrogen bring about significant decreases in the molecular weight of the polymers. In such a manner, a product suitable for any subsequent milling, calendering or extruding process may be synthesised, having the correct handling characteristics.

The molecular weights of the polymers obtained in accordance with the present invention may be calculated from a knowledge of the intrinsic viscosity, $n$, and the Mark-Houwink equation $n = KM_v^\alpha$, where $K = 7.24 \times 10^{-4}$ and $\alpha = 0.64$ and $M_v$ is the "viscosity average" molecular weight. In the unmodified form the invention produces polymers whose molecular weights are in the range $10^6$–$10^8$. With hydrogen modification molecular weights are in the range $10^3$–$10^5$.

The following examples illustrate the invention:

EXAMPLE 1

In a nitrogen flushed dry box, 4.5 g. (33.7 mmole) aluminium trichloride (anhydrous, double sublimed) and 40 ml. pure, dry normal hexane were added to a 100 ml. flask. 5.35 g. diisoamyl ether (anhydrous, oxygen-free) (33.7 mmole, approx. 6.9 ml.) was added to the well-stirred contents of the flask. The aluminium chloride dissolved to give a colourless solution.

500 ml. pure, dry normal hexane was added to a 700 ml. flange, polymerisation-type glass flask under a purified nitrogen blanket. The solution was saturated at atmospheric pressure and 0° C. with a gaseous mixture of ethylene and propylene (molar and volume ratio $E:P=1:2$ total monomer flow 1000 ml. min.$^{-1}$) for one hour with high speed (980 r.p.m.) stirring.

Vanadium oxytrichloride (0.125 mmole added as 2 ml. of a dilute hexane solution), aluminium trichloride-diisoamyl etherate (3.75 mmole or 4.45 ml. of the solution described above) and lithium butyl (5.00 mmoles, added as 5 ml. of a dilute hexane solution) (V:Al:Li=1:30:40 molar) were added in rapid succession and the polymerisation started at once. The flask was sealed and kept at a constant pressure of ¼ p.s.i.g. by the addition of ethylene and propylene monomers in the molar ratio 65/35 respectively. In this way, the concentration of monomers dissolved in the solvent was maintained at the correct level, which had been established by the one hour saturation period, throughout the reaction time. The contents of the flask were held at 0° C. by suitable cooling.

After one hour the solution had become very viscous, but the polymer remained completely soluble in the reacting medium. The reaction was terminated by the addition of methanol (5 ml.). At the same time a small quantity of an antioxidant (0.1 g. "Flectol H" made by Monsanto Chemicals Limited) in 10 ml. cyclohexane was added. The solution was well stirred.

The contents of the flask were then poured into acetone and the rubber was recovered.

The yield was 10 g. of rubber containing 70 moles percent ethylene, 30 moles percent propylene. The Intrinsic Viscosity (I.V., measured as a 0.1% w./v. solution in cyclohexane at 30° C.) was 8.0.

EXAMPLES 2–8

The same technique was used as in Example 1 except that different ratios V:Al:Li were used. As in Example 1 the absolute concentration of the vanadium oxytrichloride was 0.125 mmole. Results are given in Table 1:

TABLE 1

| Expt. No. | V:Al:Li | Yield, g.hr.$^{-1}$ 500 ml.$^{-1}$ | I.V. | Moles percent $C_3$ in rubber |
| --- | --- | --- | --- | --- |
| 2 | 1:10:10 | 7.0 | 8.7 | 36 |
| 3 | 1:10:30 | 2 | 8.0 | 32 |
| 4 | 1:20:30 | 6.8 | 7.7 | 35 |
| 5 | 1:30:30 | 10.0 | 8.1 | 30 |
| 6 | 1:40:30 | 10.5 | 11.6 | 33 |
| 7 | 1:60:30 | 9.5 | 7.0 | 33 |
| 8 | 1:100:30 | 14.5 | 9.8 | 42 |

EXAMPLES 9–10

The same technique as in Example 1 was used except that 0.4% v./v. (on total monomers) hydrogen was used to lower the molecular weight. The presence of hydrogen was required during the saturation and during the reaction periods to have the required effect.

TABLE 2

| Expt. No. | V:Al:Li | Yield | I.V. | Moles percent $C_3$ in rubber |
| --- | --- | --- | --- | --- |
| 9 | 1:30:30 | 9 | 3.0 | 25 |
| 10 | 1:30:40 | 7 | 2.8 | 30 |

EXAMPLES 11–13

The procedure as in Example 1 was used except that the ether used to give 1:1 molar adduct with aluminium trichloride was orthotolyl methyl ether. To render the adduct soluble it was necessary to add 10 ml. benzene to the premix solution.

TABLE 3

| Expt. No. | V:Al:Li | Yield | I.V. | Moles percent $C_3$ in rubber |
| --- | --- | --- | --- | --- |
| 11 | 1:10:10 | 15 | 6.0 | 42.5 |
| 12 | 1:20:30 | 15.5 | 7.4 | 42 |
| 13 | 1:30:40 | 13 | 6.7 | 40 |

EXAMPLES 14–20

The procedure of Example 1 was followed except that anisole (phenyl methyl ether) was used in place of diisoamyl ether. The other modifications and full results are given in Table 4.

TABLE 4

| Expt. No. | Vanadium compound used | V:Al:Li | $H_2$ present (percent v./v.) | Yield | I.V. | Moles percent $C_3$ in rubber |
| --- | --- | --- | --- | --- | --- | --- |
| 14 | VOCl$_3$ | 1:10:10 | Nil | 14.5 | 5.5 | 50 |
| 15 | VOCl$_3$ | 1:20:30 | Nil | 14.5 | 6.1 | 42 |
| 16 | VOCl$_3$ | 1:20:30 | 0.2 | 13 | 3.0 | 35 |
| 17 | VOCl$_3$ | 1:20:30 | 0.4 | 10 | 1.3 | 38 |
| 18 | VO(O$_n$Bu)$_3$ | 1:20:30 | Nil | 13 | 6.7 | 52 |
| 19 | VO(O$_n$Bu)$_3$ | 1:20:30 | 0.2 | 15 | 3.3 | 43 |
| 20 | VO(O$_n$Bu)$_3$ | 1:20:30 | 0.4 | 8 | 1.1 | 40 |

EXAMPLE 21

The same procedure as in Example 1 was used except that the polar compound used to form a 1:1 adduct with aluminium trichloride was tri normal butylamine $^nBu_3N$. In order to obtain a completely soluble amine complex of the trichloride it was necessary to make this premix solution up to 100% benzene solution.

Vanadyl tri normal butoxide, VO(O$^n$Bu)$_3$, was used as the transition metal component.

The yield of soluble rubber was 1.5 g. It had I.V. 9.0 and contained 41 moles percent propylene.

EXAMPLE 22

The procedure as in Example 21 was used except that the ratio V:Al:Li was 1:40:30.

The yield was 1.0 g. soluble rubber. It had I.V. 7.6 and contained 36 moles percent propylene.

EXAMPLE 23

The same procedure as in Example 1 was used except that the polar compound used to solubilise the aluminium trichloride was benzyl cyanide, $C_6H_5CH_2CN$. Benzene was used as the solvent for the 1:1 adduct of the cyanide and the trichloride.

Vanadyl tri normal butoxide, VO(O$^n$Bu)$_3$, was used as the transition metal component.

The yield of rubber which was all soluble in the reacting medium was 1.9 g. It had I.V. 7.0 and contained 37 moles percent propylene.

EXAMPLE 24

The procedure of Example 1 was used except that the monomers used were propylene and butene-1 in the ratio 1:4 (respectively) during the saturation period and in the ratio 1:1 during the polymerization period.

The yield was 8.5 g. of hydrocarbon-soluble, rubbery copolymer. Inspection of the infrared spectrum of the material showed that it was a copolymer of approximately 50% of each monomer, although accurate figures could not be obtained as for ethylene/propylene polymers. The intrinsic viscosity of the material was 9.3.

EXAMPLE 25

The procedure of Example 16 was used except that 5 g. dicyclopentadiene was added to the reaction mixture at the beginning of the polymerisation period. The yield (9.3 g. hydrocarbon-soluble, rubbery polymer) was somewhat decreased over that from Example 16. The rubber was compounded with a conventional sulphur containing recipe known to be suitable for ethylene propylene terpolymer rubbers:

|  | Parts by wt. |
| --- | --- |
| Polymer | 100 |
| HAF black | 50 |
| Paraffinic oil | 10 |
| Zinc oxide | 5 |
| Stearic acid | 0.5 |
| Tetramethyl thiuram disulphide | 1.0 |
| Mercarptobenzthiazole | 2.0 |
| Sulphur | 2.0 |

The compounded stock was then subjected to a vulcanisation test in the Wallace-Shawbury curometer. The stock cured to 95% optimum in 30 min. at 160° C.

An iodine value carried out by the standard procedure on the polymer as prepared above gave I.V.=8.1.

EXAMPLE 26

The procedure as in Example 1 was used except that titanium tetra-n-butoxide, $Ti(O^nBu)_4$, was used in place of vanadium oxytrichloride. The saturation ration $E:P$ was 1:6.

The yield was 5 g. of a rubber containing 55 moles percent ethylene and 45 moles percent propylene. The intrinsic viscosity was 7.8.

EXAMPLE 27

The procedure as in Example 1 was used except that zirconium tetra-n-butoxide, $Zr(O^nBu)_4$, was used in place of vanadium oxytrichloride. The saturation ratio $E:P$ was 1:7.

The yield was 3 g. of a rubber containing 65 moles percent ethylene and 35 moles percent propylene. The intrinsic viscosity was 6.7.

EXAMPLE 28

The procedure as in Example 1 was used except that aluminium dichlorohydride, $AlCl_2H$, was used in place of $AlCl_3$.

The yield was 9 g. of a rubbery copolymer containing 72 moles percent ethylene and 28 moles percent propylene. The intrinsic viscosity was 9.3.

EXAMPLE 29

The procedure of Example 11 was used except that methyl phenyl sulphite (thio-anisole), PhSMe, was used in place of ortho tolyl methyl ether.

The polymerisation proceeded as normal to give 6 g. of a hydrocarbon soluble rubbery copolymer. The rubber contained 55 moles percent ethylene 45 moles percent propylene and had I.V. 8.7.

EXAMPLE 30

The procedure of Example 14 was used except that ethylene was used as the sole monomer. Catalyst was added at the concentrations 0.5 mole mmole $l^{-1}$ vanadyl chloride, 5.0 mmole $l^{-1}$ aluminum, trichloride anisole complex 7.5 mmole $l^{-1}$ butyl lithium.

The reaction flask became full of insoluble, white polyethylene crumb. After 1 hr. the yield of polymer was 76.4 g. It had I.V. 9.2.

EXAMPLE 31

The procedure and conditions of Example 30 were followed except that propylene was the sole monomer used. A completely soluble, rubbery, atactic polypropylene was formed (6.3 g.) The I.V. was 5.4.

EXAMPLE 32

The procedure and conditions of Example 30 were followed except that the reaction solvent used was 250 ml. hexane and 250 ml. 4 methyl pentene-1. The latter was the sole monomer used in the reaction.

A completely soluble, rubbery, atactic polymer was formed (39.3 g.). The I.V. was 6.7.

What we claim is:
1. A process for the preparation of homopolymers and copolymers of α-olefins with up to 10% by weight of a non-conjugated diene wherein the polymerisation is carried out at a temperature of −50° C. to +150° C. by means of a catalyst comprising;
   (a) a hydrocarbon soluble compound of a metal selected from the group consisting of vanadium, titanium and zirconium, said compound being selected from the group consisting of (1) $VOX_n(OR)_{3-n}$ where X is a halogen, $3 \geq n \geq 1$ and R is alkyl, aryl or alkylaryl and (2) organic compounds of vanadium, titanium and zirconium in which a halogen atom is not directly attached to the metal,
   (b) a hydrocarbon soluble adduct of
      (i) aluminium trichloride or aluminium dichlorohydride,
      (ii) a polar compound and
   (c) an organometallic compound selected from the group consisting of alkyl, aryl and aralkyl compounds of lithium wherein the ranges of components molar ratios are as follows:
      $b(ii):b(i)$ from 0.1:1 to 10:1
      $b(i):c$ from 0.1:1 to 10:1
      $b(i):a$ from 5:1 to 100:1

2. A process as claimed in claim 1 wherein one α-olefin, selected from the group consisting of ethylene, propylene and 4-methylpentene-1, is polymerised alone.

3. A process as claimed in claim 1 wherein the α-olefin comonomers comprise a combination of monomers selected from the group consisting of ethylene, propylene, butene-1, pentene-1, 4 methyl pentene-1 and heptene-1.

4. A process as claimed in claim 1 wherein the non conjugated diene is selected from the group consisting of dicyclopentadiene, 5-ethylidene norbornene, hexadiene 1,4 and cis, trans, trans cyclododecatriene-1, 5, 9.

5. A process as claimed in claim 1 wherein components b(i) and b(ii) are premixed together.

6. A process as claimed in claim 1 wherein component (c) is mixed with component b(i) in the presence of either component (a) or at least one polymerisable monomer.

7. A process as claimed in claim 1 wherein the polymerisation temperature is in the range −15° C.−+30° C.

8. A process as claimed in claim 7 wherein the polymerisation pressure is in the range from atmospheric pressure to 5 atmospheres pressure.

9. A process as claimed in claim 7 wherein the polymerisation is carried out in an inert hydrocarbon solvent medium.

10. A process as claimed in claim 7 wherein the solvent medium is selected from the group consisting of hexane, heptane, iso-octane and cyclohexane.

11. A process as claimed in claim 7 wherein the absolute concentration of component (a) in the polymerisation mixture lies within the range 0.1–10 miligram atoms of metal per litre of total solution.

12. A process as claimed in claim 7 wherein gaseous hydrogen is used to control the molecular weight of the product.

13. A process as claimed in claim 12 wherein the concentration of hydrogen in the gaseous monomer feed is 10% by volume.

14. A process according to claim 1 wherein there are copolymerised ethylene and propylene and wherein the polymerisation is carried out within the temperature range −15° C.−+30° C. and at a pressure within the range atmospheric to five atmospheres and wherein the ranges of component molar ratios are as follows:

$b(ii):b(i)$ from 0.50:1 to 5:1
$b(i):c$ from 0.25:1 to 5:1
$b(i):a$ from 10:1 to 50:1 the reaction being carried out in an inert hydrocarbon solvent and the feed of monomers being arranged so that the ethylene content in the copolymer lies in the range 0–80 moles percent.

References Cited

UNITED STATES PATENTS 3,518,237   6/1970   Duck _____ 260—80.78

JOSEPH L. SCHOFER, Primary Examiner

R. S. BENJAMIN, Assistant Examiner

U.S. Cl. X.R.

260—88.2 R, 93.7, 94.9 E; 252—429 C